United States Patent
Price

[19]

[11] Patent Number: 6,120,166
[45] Date of Patent: Sep. 19, 2000

[54] LIGHT SOURCE APPARATUS FOR A SPECTRAL ANALYZER

[75] Inventor: Benjamin F. Price, Putney, Vt.

[73] Assignee: Janos Technology Inc., Townshend, Vt.

[21] Appl. No.: 09/036,990

[22] Filed: Mar. 9, 1998

[51] Int. Cl.[7] ..................................................... F21V 7/09
[52] U.S. Cl. ........................ 362/302; 362/303; 362/305; 362/346
[58] Field of Search .................................... 362/298, 301, 362/302, 303, 304, 305, 346, 348

[56] References Cited

U.S. PATENT DOCUMENTS

| | | | |
|---|---|---|---|
| 1,278,026 | 9/1918 | Salto | 362/303 |
| 1,300,202 | 4/1919 | Stubblefield | 362/303 |
| 2,064,880 | 12/1936 | Bostic | 362/304 |
| 2,198,014 | 4/1940 | Ott | 362/303 |
| 3,283,142 | 11/1966 | Freeman | 362/298 |
| 4,943,159 | 7/1990 | Oetliker et al. | 356/73 |
| 5,428,222 | 6/1995 | Alexay | 250/343 |
| 5,695,277 | 12/1997 | Kim | 362/303 |

FOREIGN PATENT DOCUMENTS 931426  10/1947  France ................................. 362/302

*Primary Examiner*—Alan Cariaso
*Attorney, Agent, or Firm*—Herbert M. Wolfson

[57] ABSTRACT

A filter IR spectral analyzer has a highly efficient compact imaging optical collector having a first concave reflector of ellipsoidal design or shape, having a light source at one of its foci and a second concave reflector of spherical design which has its focus at the center of the light source. The light emitted from the source that strikes the ellipsoidal primary mirror converges to a second focal point located in an exit aperture in the center of the second reflector. The light that does not strike the ellipsoidal primary mirror reflects off the secondary mirror and returns to the source for reabsorption and re-emission. Compactness is achieved for multi radius versions by the use of a segmental spherical secondary mirror with each facet being radiused with its origin at the source so that all act together as though they were one large spherical mirror. Four possible configurations are described.

3 Claims, 4 Drawing Sheets

LIGHT SOURCE APPARATUS FOR A SPECTRAL ANALYZER

BACKGROUND OF THE INVENTION

This invention relates to a filter spectrometer and precisely to an improvement over existing filter spectrometers, and this invention is adapted to the measurement of multiple components of materials in the gas, liquid, and solid phase.

Spectrometers of the filter type are universally utilized for the analysis of many types of materials in the various states of solids, liquids, and gases, this measuring is done by employing cell holders or light guides of different types to achieve absorption or modification of light transmitted through or absorbed at the interface with the sample. Many of the present day analyzers are designed to operate and measure the effect of a specimen upon light rays of a single wavelength and many also apply two or three detectors to simultaneously measure several components of the mixture.

Although the infrared wavelengths are the most widely utilized, it is also quite possible to utilize photons in the ultraviolet wavelengths, the visible wavelengths, and even broad band light waves depending upon the materials to be analyzed and the components thereof, particularly when suitable filters are utilized.

Some of the problems experienced with existing analyzers include relatively low signal-to-noise, poor collection efficiency and very limited sample compartments precluding the facile use of well established and widely used IR accessories such as long-path gas cells, liquid containing sample cells, attenuated total reflection (ATR) devices, microscopes, beam condensers, and similar devices.

It is the object of the present invention to provide an analyzer permitting the facile utilization of standard sampling accessories for use with liquids, solids, and gas materials, and secondly, to provide a device which is highly efficient and relatively small in size.

A further object of the invention is to provide an analyzer which has the capability to analyze complex multi-component mixtures.

A still further object is to provide a novel method for spectral analysis using such a filter spectrometer.

SUMMARY OF THE INVENTION

It has now been realized that all goals stated above can be readily obtained by using one of the several highly novel versions of a complex geometry source described herein which permits control of the emergent cone of energy with a coherent beam of light for ease of interaction with a wide variety of sampling accessories permitting ready examination of all types of liquid, gas, and solid samples. Also, this novel design which gives a coherent output beam from the source does not require the use of a compound parabolic concentrator (CPC), a non-imaging optical device, to further concentrate the light which impinges upon the filter array and then the detector array. This ability to dispense with the CPC which is integral to the instruments based on U.S. Pat. No. 5,428,222 is a great manufacturing and economic advantage. It is also unnecessary to have a functioning wave guide, an integral function of which is to collect the incoherent light emitted from the source and achieve a coherent light beam which is then concentrated by the CPC element.

The several new and novel systems which achieve these desired results are summarized below.

Configuration 1

This device employs an ellipsoidal-Spherical combination of mirrors in which the concave ellipsoid focus of energy has a concave spherical mirror at its second focus. The nature of the geometry of the ellipsoidal mirror is critical to the control of the cone of radiation emergent from the source compartment. Thus, light emanating from the source strikes the ellipsoidal mirror then converges to a second focal point positioned in an aperture in the center of the spherical secondary mirror. Light from the source which does not strike the ellipsoidal primary mirror reflects off of the spherical secondary mirror and returns to the source for reabsorption and is then emitted again from the source. The beam emergent from the source is adequately coherent to enter the classical sampling type of compartment common to all modern spectrometers.

Energy which has transited the sample compartment and interacted with the solid, liquid or gas sample then falls upon the array of filters and then onto the set of detectors immediately behind the filter set. The signal from the several detectors is reduced to visual information by electronic manipulation, for instance by meters, liquid crystal displays, CRT, or other suitable methods. Computers of various types are utilized to enhance and manipulate the data as desired.

Configuration 2

Configuration 2 is quite similar to Configuration 1 except that the ellipsoidal mirror contains several facets of spherical geometry, all radiused from the source, without the inclusion of a separate spherical mirror element. As before in Configuration 1, the cone of emergent energy is directed through the sample compartment, followed by the filter and detector array, without need for a CPC element to partially collimate the energy as described in U.S. Pat. No. 5,428,222.

Configuration 3

Configuration 3 is a complex source employing four mirrors. The initial unit is an ellipsoidal mirror containing the source at one focus, a secondary spherical mirror, a tertiary parabolic mirror with a secondary tertiary mirror which forms a coherent energy beam directed to a sample compartment or conveniently to a long-path gas cell.

Configuration 4

Configuration 4 consists of an elongated ellipse with the source at the first focus, and the light energy directed from a companion spherical mirror which directs the light energy incident on the spherical mirror to a small convex mirror located at the second focus of the ellipse, which directs the incident energy through an aperture in the spherical mirror as a well collimated beam directed to a sample compartment for interaction with sampling accessories containing liquid, solid, or gas samples, and thence to the filter-detector array and data display means.

NUMBER LIST

Figure 1:
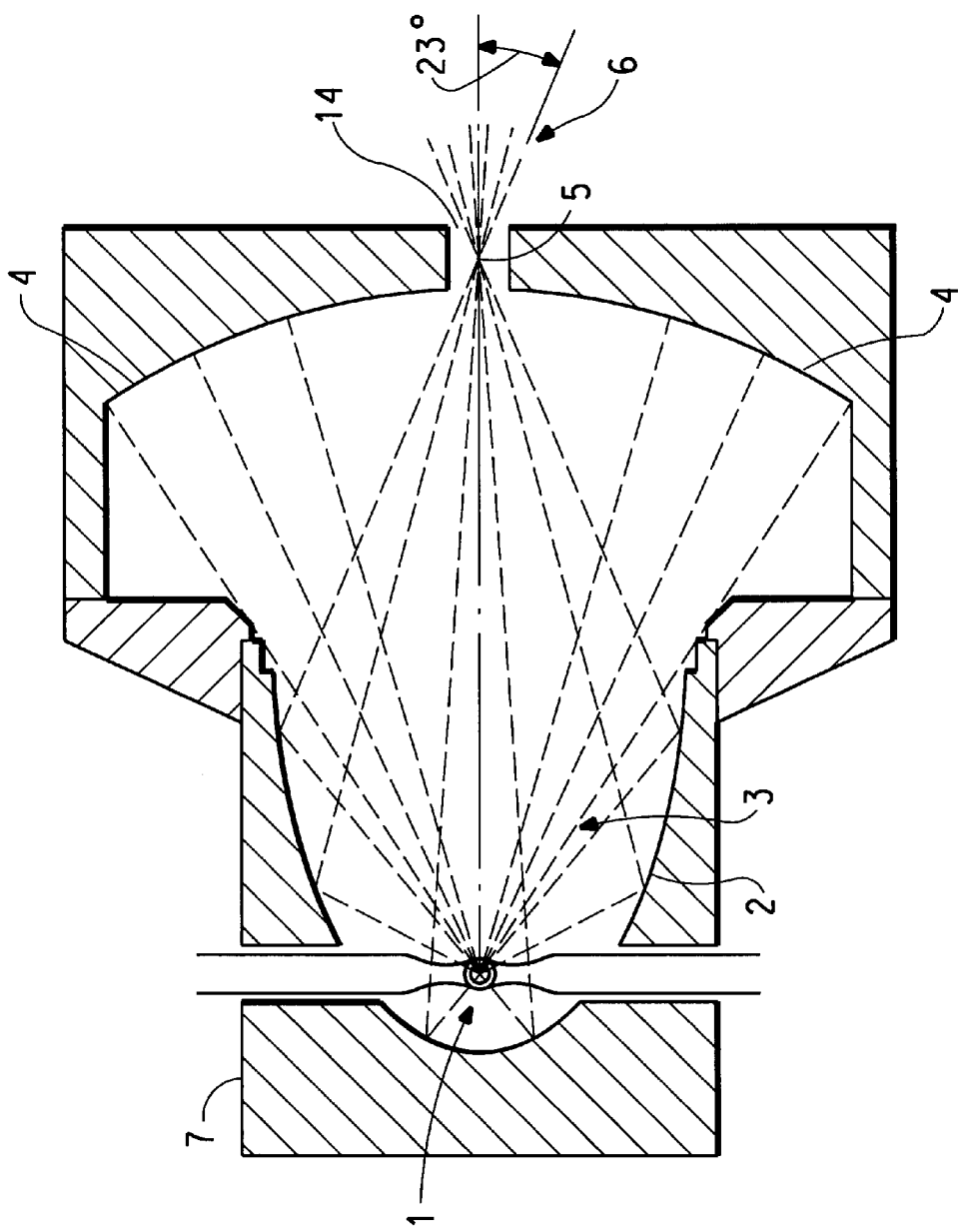
FIG. 1 is a partial diagrammatic view of a spectral source for gases, liquids and solids embodying the present invention, (configuration 1).

1 Source
2 Ellipsoidal mirror
3 Ray trace
4 Spherical mirror
5 Second focus of ellipse
6 Emergent energy cone
7 Housing
8 Segmented spherical mirror 9 Emergent rays to sample compartment
10 Second spherical mirror
11 Off axis parabolic mirror
12 Collimated ray trace
13 Convex mirror
14 Apperture

DETAILED DESCRIPTION OF THE INVENTION

A. Configuration 1

Considering initially FIG. 1 the source module of the spectrometer is diagrammatically described and consists of a light source 1, an ellipsoidal primary mirror 2, a secondary spherical mirror 4, a second foci of the ellipsoidal mirror 5, an assembly source mounting 7, a set of lines designating the ray tracing 3 of the light path in the source module, and a cone of rays 6, emergent from the source.

The collector is conveniently comprised of an ellipsoidal mirror 2 and an opposing secondary spherical mirror 4. A coaxial aperture is provided in the secondary spherical mirror 4. The light source 1 is coaxially disposed in the optical cavity created by the two mirrors 2 and 4. Light rays generated by the source will be reflected from the mirrors 2 and 4 and directed to the aperture 14. The light source 1 is connected to a power source (not shown) by a cable.

Further considering FIG. 1, with respect to the pathway taken by the light rays, the light rays emergent from the source 1 strike the first ellipsoidal mirror. Such rays may then strike the spherical mirror 4 and return to the source 1 for re-emission, or strike additional surfaces of the ellipsoidal mirror 2 and emerge at the circular aperture 14 of the spherical mirror 4. This circular aperture 14 in the spherical mirror 4 constitutes the second foci 5 of the ellipsoidal mirror 2, each ellipsoidal optical element possessing two foci in contrast to spherical mirrors which possess one focus. The light rays which pass into the aperture 14 exit through the sample aperture.

B. Configuration 2

Figure 2:
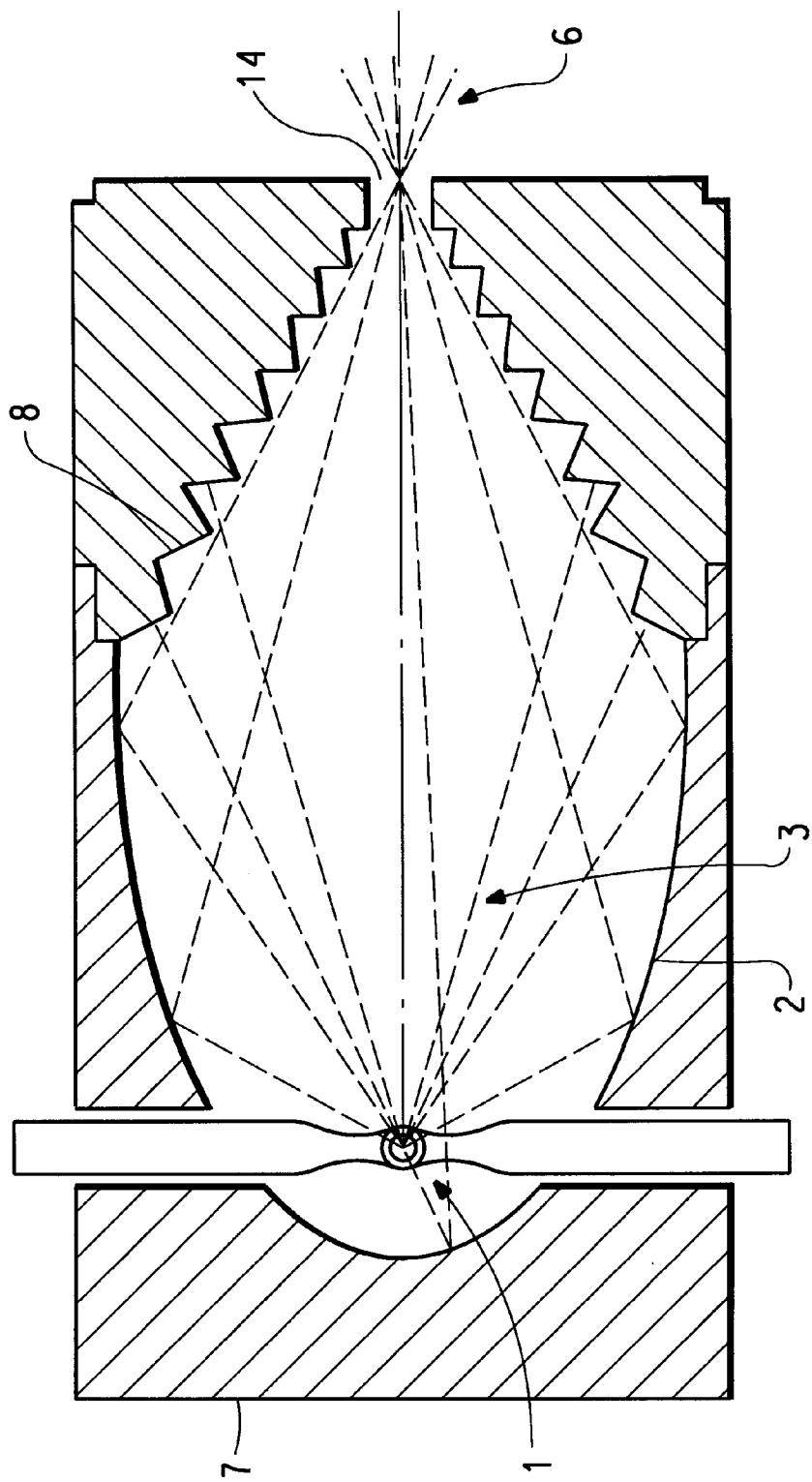
FIG. 2 is a partial diagrammatic view of configuration 2.

FIG. 2 describes a more complex source compartment in which the rays 3 emanating from the source 1 strike the ellipsoidal surface 2 and are in part directed to the aperture 14, and in part to the partial spherical radii 8, which are radiused to the source as the arc ray traces indicates. Rays from the partial spherical radii return to the source for re-emission to the aperture. The emergent cone of rays 6 is adequately coherent to interact with all sampling accessories contained in the sample compartment for liquid, solid, and gas samples for IR examination.

C. Configuration 3

Figure 3:
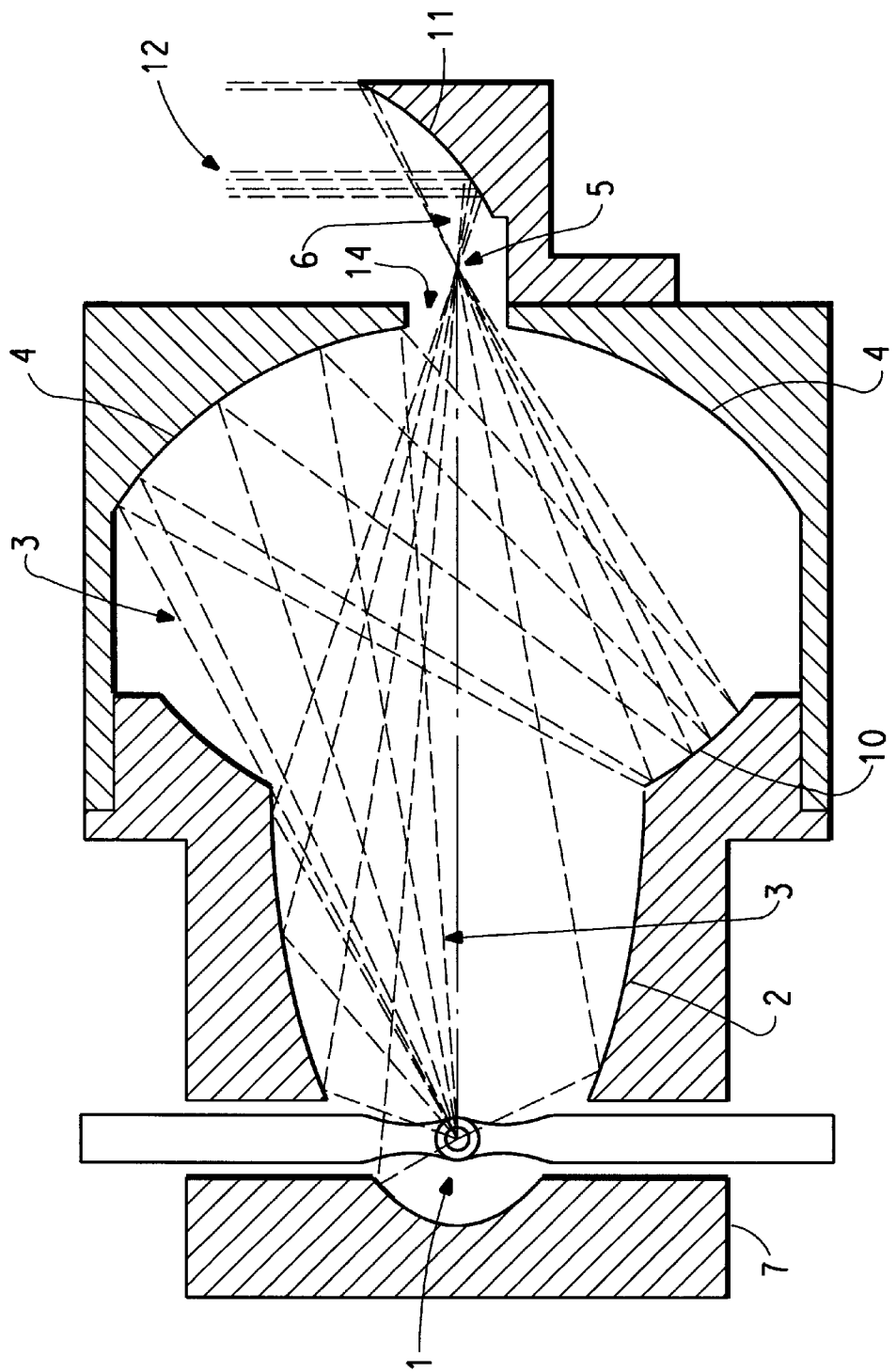
FIG. 3 is a partial diagrammatic view of configuration 3.

FIG. 3 describes a very complex source compartment consisting of a source 1, an ellipsoidal mirror 2, ray traces of the light path 3, a first spherical mirror 4, a second spherical mirror 10, an aperture 14 for the collected coherent emitted light beam 6 which is further collimated by a parabolic mirror 11 exterior to the source cavity. Tracing the energy path from the source shows light energy reflected from the ellipsoidal mirror to the first spherical mirror, thence to the second spherical mirror segment which further concentrates energy to the exit aperture 14, thence to the exterior parabolic mirror 11 which gives a highly collimated beam 12 to the sample compartment (not shown).

D. Configuration 4

Figure 4:
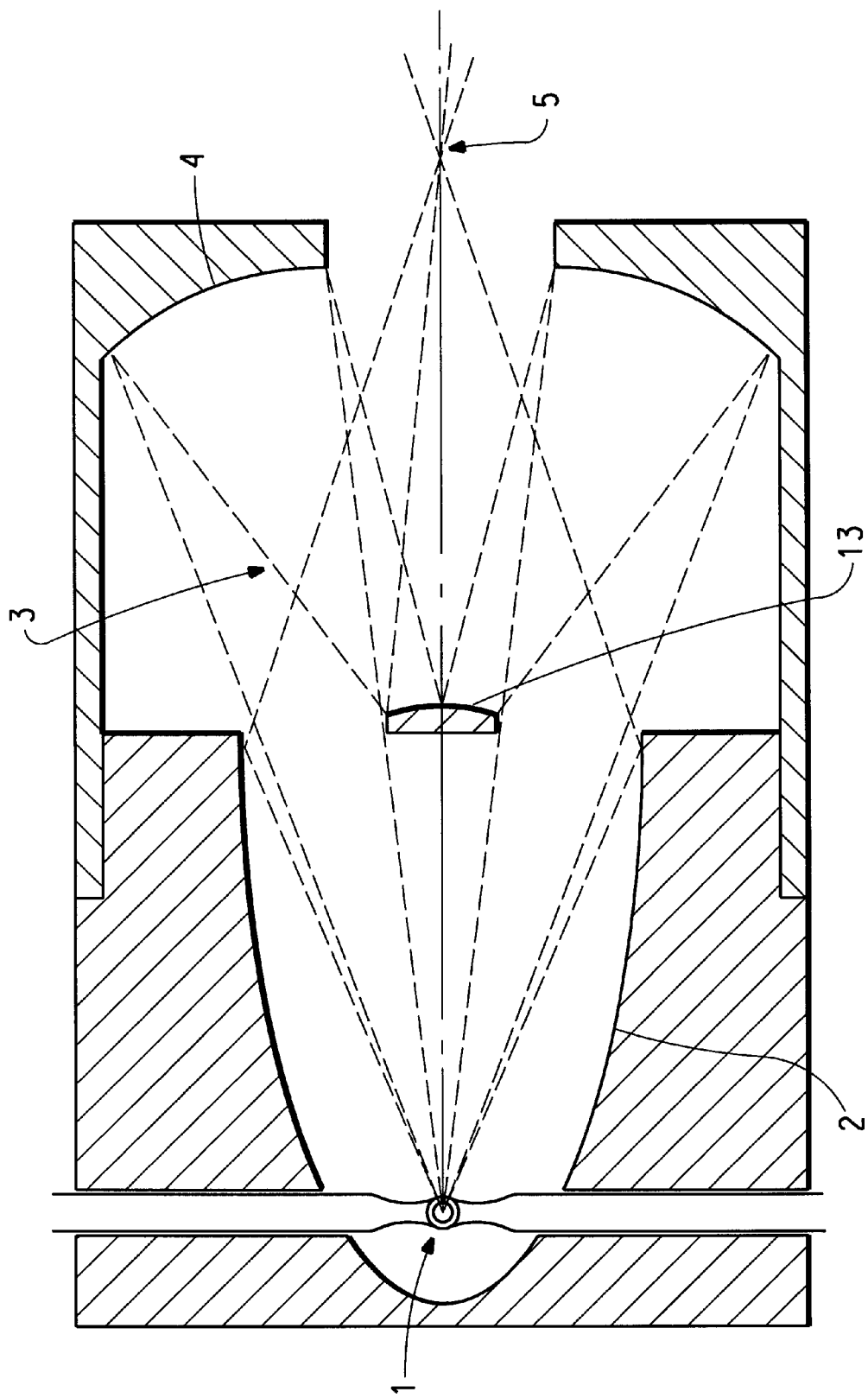
FIG. 4 is a diagrammatic view of configuration 4.

FIG. 4 describes a novel combination of a source 1, ellipsoidal mirror 2, a spherical mirror 4, and a convex mirror 13, for the purpose of taking the IR energy beam from the source to a beam of coherent energy in the sample compartment for interaction with various types of IR accessories which have been developed which can be utilized with all existing types of spectrometers for determining the IR spectra of solids, liquids and gases by a variety of devices employing transmission, reflection, refraction, ATR, and diffuse reflection.

The source 1, emits light into an elongated ellipsoidal element 2 with mirror surfaces, which is focused onto the elliptical surface 2 and onto a spherical mirror 4 surface. All of the radiation incident upon the ellipsoidal mirror and spherical mirror are collected at the face of a small convex mirror 13 which diverts the energy to the sampling compartment which will contain various sampling accessories. The path of the light energy is indicated by the ray trace 3.

What is claimed is:

1. In a light source apparatus for generating coherent light comprising:

a) an elliptical reflector defining a near focal point and a far focal point;

b) a light source located at the near focal point, said elliptical reflector reflecting light rays emitted from said light source;

c) a concave spherical reflector disposed opposite said elliptical reflector having an aperture in the center thereof for reflecting light rays emitted from said light source back toward said light source, the aperture of said spherical reflector being positioned at the far focal point of said elliptical reflector, the improvement wherein a tertiary parabolic mirror is located off-axis and sufficiently past said far focal point at the aperture to transmit a coherent beam of light for use in spectral analysis.

2. An apparatus as in claim 1, wherein the improvement further comprises a secondary concave spherical reflector disposed around said elliptical reflector and adapted to reflect the light directed from said concave spherical reflector disposed opposite said elliptical reflector to said off-axis tertiary parabolic mirror which transmits a coherent beam of light for use in spectral analysis.

3. In a light source apparatus for generating coherent light comprising:

a) an elliptical reflector defining a near focal point and a far focal point;

b) a light source located at the near focal point, said elliptical reflector reflecting light rays emitted from said light source;

c) a concave spherical reflector disposed opposite said elliptical reflector having an aperture in the center thereof for reflecting light rays emitted from said light source back toward said light source, the aperture of said spherical reflector being positioned at the far focal point of said elliptical reflector, the improvement wherein said concave spherical reflector disposed opposite said elliptical reflector having an aperture in the center thereof, is replaced by an extension of the elliptical reflector having an aperture in the center thereof and is segmented to contain several facets all radiused from said light source for reflecting light rays emitted from said light source back toward said light source with its aperture being positioned at the far focal point of said elliptical reflector to transmit a coherent beam of light for use in spectral analysis.

* * * * *